United States Patent
Kutra et al.

(10) Patent No.: US 10,403,039 B2
(45) Date of Patent: Sep. 3, 2019

(54) VIRTUAL INTERACTIVE DEFINITION OF VOLUMETRIC SHAPES

(71) Applicant: KONINKLIJKE PHILIPS N.V., Eindhoven (NL)

(72) Inventors: Dominik Benjamin Kutra, Hamburg (DE); Hans Barschdorf, Dassendorf (DE); Thomas Buelow, Grosshansdorf (DE); Kirsten Regina Meetz, Hamburg (DE); Joerg Sabczynski, Hamburg (DE); Stewart Young, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 16 days.

(21) Appl. No.: 15/532,169

(22) PCT Filed: Nov. 25, 2015

(86) PCT No.: PCT/EP2015/077579
§ 371 (c)(1),
(2) Date: Jun. 1, 2017

(87) PCT Pub. No.: WO2016/091583
PCT Pub. Date: Jun. 16, 2016

(65) Prior Publication Data
US 2017/0270708 A1 Sep. 21, 2017

(30) Foreign Application Priority Data
Dec. 8, 2014 (EP) .................................... 14196686

(51) Int. Cl.
*G06T 17/10* (2006.01)

(52) U.S. Cl.
CPC .......... *G06T 17/10* (2013.01); *G06T 2210/41* (2013.01)

(58) Field of Classification Search
CPC ......... G06T 17/00–30; G06T 19/00–20; G06F 3/048–04897
See application file for complete search history.

(56) References Cited

U.S. PATENT DOCUMENTS

| | | | |
|---|---|---|---|
| 8,520,932 B2 | 8/2013 | Cool et al. | |
| 9,053,565 B2 | 6/2015 | Buelow et al. | |
| 9,601,030 B2 | 3/2017 | Ratcliffe et al. | |
| 2002/0026127 A1* | 2/2002 | Balbierz | A61B 18/1206 600/567 |
| 2007/0046685 A1 | 3/2007 | Lessieux | |
| 2007/0115204 A1 | 5/2007 | Budz et al. | |
| 2008/0020362 A1 | 1/2008 | Cotin et al. | |
| 2010/0266170 A1* | 10/2010 | Khamene | G06K 9/469 382/128 |

(Continued)

FOREIGN PATENT DOCUMENTS

RU 2202276 C2 4/2003

OTHER PUBLICATIONS

Hidarsi NPL Video Titled "Gallbladder segmentation 3D", published Jul. 9, 2012, available for viewing at: https://www.youtube.com/watch?v=L2x4ys_55Rs; select screenshots included. (Year: 2012).*

(Continued)

*Primary Examiner* — Daniel F Hajnik

(57) ABSTRACT

A method and related system (IPS) to support definition of a sub-volume (SV) in an initial image volume (IV).

13 Claims, 5 Drawing Sheets

(56) References Cited

U.S. PATENT DOCUMENTS

| | | | |
|---|---|---|---|
| 2012/0209106 A1* | 8/2012 | Liang | A61B 5/7425 600/414 |
| 2013/0002646 A1 | 1/2013 | Lin et al. | |
| 2013/0135305 A1 | 5/2013 | Bystrov et al. | |
| 2014/0276102 A1* | 9/2014 | Lee | A61K 49/0032 600/476 |
| 2015/0078640 A1* | 3/2015 | Guo | G06T 7/0083 382/131 |
| 2016/0070436 A1* | 3/2016 | Thomas | A61B 5/055 715/771 |
| 2016/0143697 A1* | 5/2016 | Chen | G06T 19/00 703/2 |

OTHER PUBLICATIONS

Math 133: "Volume by Slicing and Rotation About an Axis", Jan. 9, 2012, pp. 1-14.
Creating Tubes—Extruding along Curves in Maya (Pt. 2), Aug. 21, 2012, Video.
Steve Marschner: "Surfaces and Solids", 2013, pp. 1-26.
Kumer, P. "Mesh based ROI correction interface for organ delineation in radiation oncology planning". Signal Processing and Its Applications (CSPA), 2010 6th International Colloquium, May 21-23, 2010, pp. 1-5. I.

* cited by examiner

VIRTUAL INTERACTIVE DEFINITION OF VOLUMETRIC SHAPES

CROSS-REFERENCE TO PRIOR APPLICATIONS

This application is the U.S. National Phase application under 35 U.S.C. § 371 of International Application No. PCT/EP2015/077579, filed on Nov. 25, 2015, which claims the benefit of European Patent Application No. 14196686.1, filed on Dec. 8, 2014. These applications are hereby incorporated by reference herein.

FIELD OF THE INVENTION

The invention relates to an image processing method, to an image processing system, to a computer program element and to a computer readable medium.

BACKGROUND OF THE INVENTION

An objective in cancer surgery is the removal of tumor tissue together with a safety margin of tumor-free tissue around the tumor tissue. Some cancers have a preferred direction of growth. For example, breast cancer often grows along the lobules, in a direction perpendicular to the pectoral muscle. It is standard clinical practice to remove a volume of cylindrical shape from the breast, extending from the pectoral muscle to the skin.

Reporting and planning of such surgeries is almost exclusively performed by manually applying (with a felt pen for instance) incision lines directly on the skin of the patient which can then be recorded by a taking a photograph for instance. On occasions, the incision lines are applied as annotations on a pre-printed paper form where a generic representation of the relevant organ is shown. These lines are to capture a contour or shape of the cancer in a plan view. In other words, the shapes are only drawn in two dimensions (as outlined from one viewing direction). But the three dimensional extent of the volume to be removed and the orientation thereof within the surrounding tissue is not explicitly recorded and must therefore be mentally estimated by the reader of such reports.

SUMMARY OF THE INVENTION

There may therefore be a need in the art for an alternative method and/or related system to address at least some of the deficiencies noted above.

The object of the present invention is solved by the subject matter of the independent claims where further embodiments are incorporated in the dependent claims. It should be noted that the following described aspect of the invention equally apply to the image processing system, to the computer program element and to the computer readable medium.

According to a first aspect of the invention there is provided an image processing method, comprising:
  receiving i) an image volume, ii) a profile shape and iii) a propagation curve;
  propagating said profile shape across the image volume along said propagation curve to thereby generate a sub-volume in said volume; and
  displaying of said sub-volume on a display device,
  wherein the image volume is stratified, wherein the propagation of said profile shape automatically terminates at an interface between two strata in the volume or wherein the sub-volume SV is truncated at said interface, so that the sub-volume does not extend across said interface.

This allows producing sub-volumes that "respect" the inner structures of the surrounding image volume IV by including surface definitions of said interfaces as constraints into the computation of the sub-volume.

According to one embodiment, the method comprises displaying of said sub-volume together with the image volume.

The method allows taking advantage of sundry three dimensional digital representation of the object of interest (eg, breast), obtained e.g. from MRI with surface scans, or from a personalized models. In particular reporting and/or planning of surgical procedures can be made easier, in particular, "virtual", 3D resection volumes can be produced.

According to one embodiment, the method comprises displaying the image volume, or at least a part thereof, and gradually building up display of the sub-volume during said profile shape propagation whilst the sub-volume is being swept out in the image volume. This affords a particularly evocative representation because the user can "see" the dynamics of the computation and in particular they can see or guess whether the sub-volume will actually cover a pre-defied region in interest (ROI), such as a tumor site, in the volume IV. The user can see even before conclusion of the computation whether the sub-volume will wholly contain the ROI and if not, the computation can be aborted beforehand and re-run with possibly new propagation direction and/or adjusted size of the profile shape.

According to one embodiment, the method comprises computing a size (that is, the numerical volume) of the sub-volume and/or a ratio between the sub-volume and the volume.

According to one embodiment, the method comprises issuing a signal if the computed size of the sub-volume and/or the computed ratio violates a pre-defined threshold.

According to one embodiment, the volume includes a pre-defined critical region and wherein an alert signal is issued if said critical region is not completely enclosed by said sub-volume or if more than a pre-defined amount of said critical region extends to the outside of said sub-volume. In particular in surgery, this allows pre-interventional/pre-operative precise definition of the amount of tissue to be removed with respect to the surrounding patient tissue. Previously, these figures were only available post-operative upon pathological examination of the actually excised tissue.

According to one embodiment, the image volume is any one of an MRI image, a CT image, an optical 3D image, 3D ultrasound image, a personalized model volume, or a generic volumetric model.

According to one embodiment, the profile shape is adjustable.

According to one embodiment, the profile shape is automatically identified in the image volume.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
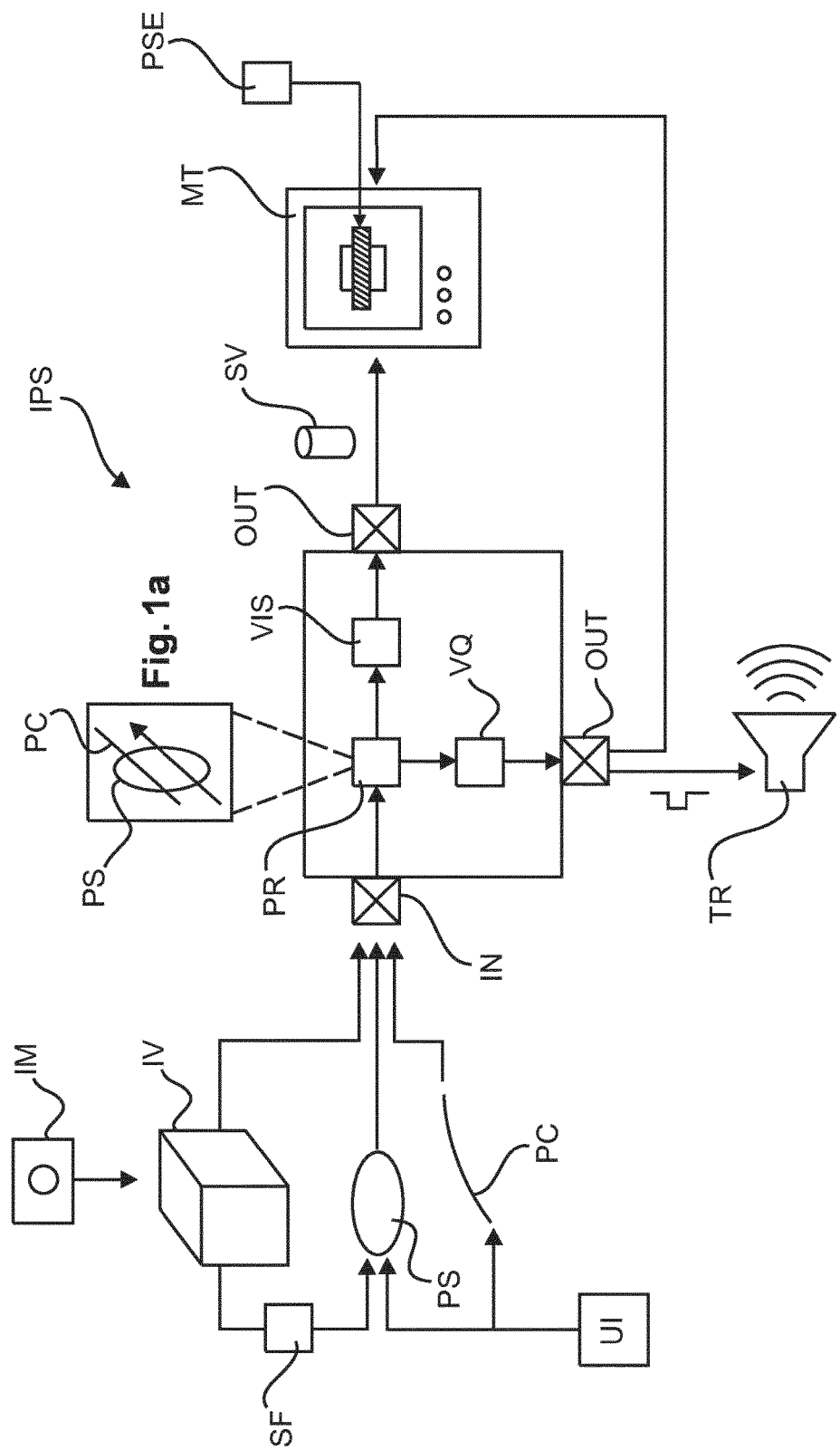
FIG. 1 shows a block diagram of an image processing system.

FIG. 1 shows a schematic block diagram of an image processing system IPS as proposed herein. The image processing system IPS allows definition of the sub volume in potentially complex volumetric image data IV. The image processing system IPS can be used as one exemplary field application in surgery planning ("virtual surgery") such as in breast surgery although it would be appreciated herein that the proposed imaging processing system may also be used with benefit in, for instance, manufacturing design, computer aided design and/or 3D printing or any other field of endeavor where, for instance, a requirement of precise definition of an object to be excised from surrounding material is of a premium.

In one embodiment, the proposed system IPS allows a user to interactively define a sub-volume of SV tissue within a predefined image volume IV of an image object (e.g. of breast of a patient). The image volume IV and or the sub-volume SV may be defined by triangulated meshes defining boundary surfaces of interest. The apparatus generates the SV as a 3D shape, which is representing the re-section volume for a surgical procedure.

The 3D shape of the sub-volume SV is generated by using a definition of a propagation trajectory (eg, a straight line segment), a user-defined, or automatically computed (such as rule-based or image based) 2D shape. The 3D shape SV is generated by the propagating or shifting of the user defined 2D shape PS along the trajectory PC.

The 3D shape SV is restricted according to predefined constraints, for instance one or more predefined surfaces in the surrounding volume SV representing borders of different organs or other pre-defined stratifications depending on the particular application context. The restriction is by truncating the computed sub-volume and some or all said surfaces. In other words, the image processing apparatus IPS is configured to respect said pre-defined constraints within the image volume IV when producing the sub-volume SV.

The principle input parameters for the image processor IPS as proposed herein includes an image volume IV generated by a suitable image modality IM (CT or MRI or other), or are constructed from a model, with sufficient structural definition of the internals of the object of interest (eg, a female breast), a definition for the profile shape curve or "contour" PS and said propagation curve PC.

The contour curve PC which in general is a plane ("2D") curve and the propagation curve PC are advantageously defined by the user using in particular, graphical user input UI means although text based input is also envisaged in some embodiments.

The image processor IPS includes a propagator PR, a visualizer module VIS. In one embodiment, there is also a volume quantifier VQ configured to compute numerical data in respect of the sub-volume SV.

Briefly, operation of image processor IPS is as follows: the image volume IV to be processed along the profile shape PS and the definition of the propagation curve PC are received at input port IM. A profile shape or contour is then propagated along the propagation curve by propagator PR as diagrammatically and schematically shown in inset FIG. 1A. The (in general plane and closed) curve PC whilst travelling in a direction as defined by the propagation curve PC through the volume IV, sweeps out or generate a sub volume SV therein the so defined a re-section volume. This so defined sub-volume SV can then be rendered together with the initial image volume IV or in isolation separately on monitor MT. An object is to so define the sub-volume, so that a pre-defined region of interest (ROI), such as a mass of cancerous tissue or a tumor site, is at least partly (preferably wholly) enclosed by the sub-volume SV. As briefly mentioned earlier, according to one embodiment, the image processing system IPS includes a suitable user input means, in particular graphical user input means for the user to define or edit interactively the profile shape PS and propagation curve PC and/or in fact the critical ROI within the volume IV.

Again, although the operation will be explained with particular reference to the definition of a re-section volume SV in breast surgery (with the image volume IV being representative of image material of the relevant breast), this is not to be construed as limiting the scope of application of the image processor IPS as proposed herein as other surgical and non-medical applications are likewise envisaged herein.

Figure 2:
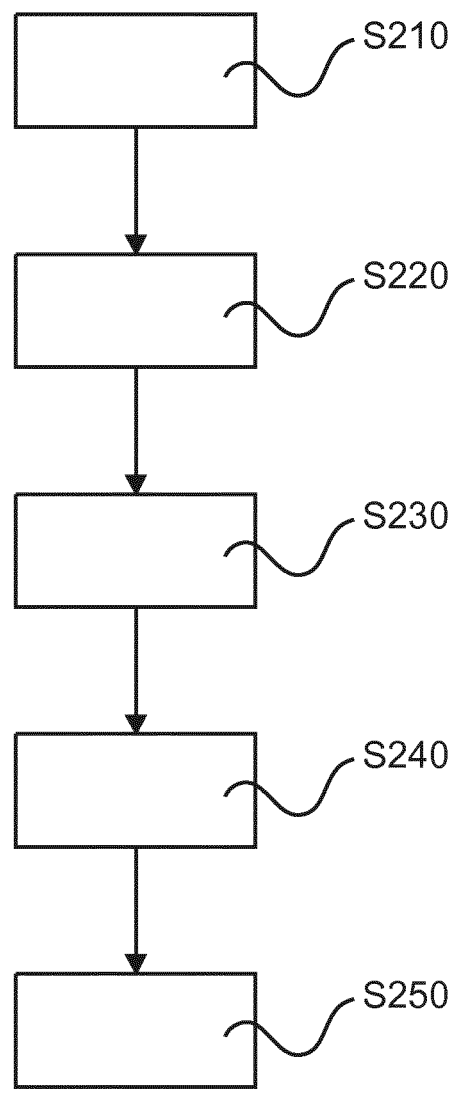
FIG. 2 shows a flow chart of an image processing method.

Operation of image processor IPS will now be explained in more detail with reference to the flow chart in FIG. 2.

At step S210 the above mentioned input parameters (volumetric image IV, profile shape PS and propagation curve PC) are received. In particular, the image volume IV when so received is initially displayed by the visualizer VIS on monitor MT in a view port.

In the following it will be useful to distinguish between two types of directions: one is the propagation direction of the profile shape PS as defined by the propagation curve PC, and another is the viewing direction on the image volume IV at a particular instance. The viewing direction can be interactively defined by mouse click or touch screen action (if the monitor so affords) or by any other form of user input although automatic definitions are also envisaged herein in some embodiments. For instance, in the interactive embodiment, the user may define his preferred viewing direction by a click-drag mouse operation or by swiping or other touch screen actions across the screen MT to effect for instance a rotation or shift of the represented view of the image IV. In one embodiment, the viewing direction may be defined as the normal of a viewing plane. The viewing plane itself can be displayed by outlining a representative square, rectangle, circle or triangle (or any other shape) as a plane orientation indicator within said plane with the inside of the representative rendered in a different hue or at higher opacity than the surrounding image IV.

The image volume representation IV itself can be any suitable representation or rendering of: a generic organ model, a personalized version of a generic organ model, a segmentation result from an image (MRI, CT, 3D optical, etc) acquired of the patient by a suitable modality IM (CT scanner, MIR imager or depth sensing camera, etc), or (personalized) model data based on such imagery. The model or image based image volume IV may be deformed to account for gravity acting on the relevant organ to better mimic the actual appearance of the organ as it would present in an operating theater.

The ROI to be embedded or surrounded by the sub-volume SV within the volume IV can be derived from a fully or semi-automatic segmentation given the image volume IV or can be likewise defined interactively by the user whilst the image volume is displayed. The ROI ("surgical target", e.g. the tumor object) can be rendered if its location/shape/size are known. The ROI can then be inserted into the image IV as a virtual tumor object, positioned and adaptively adjusted in size by the user. For instance, this can be achieved by interactively positioning a marker such as a sphere (or any other geometrical object) in the image volume IV (representative of the organ). The size of the sphere, and thus of the ROI, can e.g. be adapted using the mouse wheel for instance to inflate or deflate the sphere. The position of the sphere can be changed by translating it in the viewing plane. To change the 3D location of the ROI marker sphere, the steps of translating the sphere in the viewing plane and/or changing the viewing direction can be alternated.

Upon definition of the ROI by the user or upon loading a ROI segmentation into the image volume IV, the ROI in the volume IV is then displayed at the desired viewing direction on screen MT. In one embodiment, this initial viewing direction can be automatically proposed by the user based in imaging protocols for the relevant organ. In one embodiment, if the initial viewing direction is automatically proposed, the system awaits a corresponding confirmation event such as a mouse click or touch screen event.

In one embodiment, to support the user in defining the profile shape and/or propagation direction, image processor IPS operates to render on screen the viewing plane so that the normal of said plane is parallel to the currently chosen propagation direction. In one embodiment, the position of the viewing plane (in particular, a spatial depth thereof) can be defined by the user or can be adjusted by the system so that the viewing plane intersects the center of the ROI or intersects the represented organ at its center. The initial viewing direction can be pre-computed so as to present a frontal view of the organ. Alternatively, the viewing direction can be interactively adapted by the user in order to define the orientation of the resection volume SV to be drawn. The viewing plane can be either rendered in the foreground as in FIG. 3B or can be rendered in "hidden" vista as in FIG. 3A.

As to the definition of the profile or contour shape curve PS, in one embodiment this can be edited or defined by the user by entering suitable shape information. The profile or contour shape PS defines the local or overall cross sectional shape of the sub-volume SV to be computed. Different input modes or editing modes as per the user input means UI or a profile editing tool PSE are envisaged herein. These modes include, but are not limited to, free form drawing of a closed contour, a polygon defined by interactively defining vertices, definition of a circle or other shape defined by the center of the tumor (if given) and an additional point on the circle-contour. If the definition of the profile shape is via user drawing interaction, the shape is rendered in the viewing plane which may also be referred to herein as the drawing plane with the understanding that the orientation of the viewing plane (that is, the viewing direction as per the normal of the viewing plane) may be changed after completion of drawing the profile shape. The shape will then be rendered in different perspective views (possibly distorted) in response to the user requested change of viewing plane/direction. As an extension of this, in one embodiment, the IPS allows the user to change the viewing plane whilst the drawing is ongoing. The drawing plane therefore maintains the previous orientation of the viewing plane so the drawing plane may not therefore be parallel at all times during the profile shape drawing or definition.

The 2D shape PS may also be derived automatically by operation of a shape finder tool SF. In embodiment the shape finder tool projects the tumor shape as per a given viewing direction onto the viewing plane with an optional dilation to account for a safety margin (e.g., the resection margin in surgery planning). It is assumed that the tumor ROI has already been segmented beforehand by a manual or automatic segmentation tool so that the shape finder SF can act thereon as described. However in other embodiments, the shape finder includes a segmentation tool to perform the segmentation first and to the projected to segmented shape onto the viewing plane.

Upon the user confirming the viewing direction, e.g. by issuing a mouse click or touch screen or keyboard event, flow control passes on to step S220.

At the propagation step S220, the user defined or automatically generated 2D shape PS is translated along the propagation curve PC to generate a general prism (if the curve is a line) or more generally (if the curve is not a line) a "tube" having as its cross-section the user entered shape PS. The curve PS can be a line orthogonal to the viewing plane or any curve either pre-defined by the application at hand or user-defined.

In one embodiment the propagation curve passes through an internal point of the curve, for instance the central point, and the profile shape then propagates in this configuration along the propagation curve, in other words the propagation curve is always maintained within the area outlined by the respective profile shapes. However, this may not be necessarily so in all embodiments. For instance, the profile shape may also propagate alongside the propagation curve through the volume IV so the curve PC does not pass through the (in generally closed) curve PS. If the propagation curve is not a straight line, (that is, has non-zero curvature, for instance, is a concave or convex curve) the profile shape traces out a tube whilst travelling in the direction of the propagation curve. In other words, the embodiment where the propagation curve is a line can be understood as a special case where the propagation proceeds along a single direction whereas propagation along a curve with non-zero curvature corresponds to propagation along changing directions (tangential directions of the curve). Piece-wise defined propagation curves PC (whether linear or not) are also envisaged herein.

For instance, the propagation curve may be redefined by a number or straight line segments joined at respective ends to so define a "kinked" propagation curve. For instance, the user may allow, first, the propagation shape to propagate along the first line segment. The user then issues an interrupt signal whereby the propagation is halted. The user then joins at the current position of the end of the current line segment another line segment proceeding in a different direction. The user then issues a resume command and the propagation shape will continue now along the second line segment. In order to ensure smooth transitions at the kinks, the propagation can be made to extend at the joining point so that the respect sub-sub-volumes (around each of the propagation curve segments) mutually penetrate each other. Taking this example further, it can be seen that arbitrary complex shapes can be generated by defining a plurality of (not necessarily connected) propagation directions or propagation curves. The same or different shapes are then allowed to propagate along each of those curves. In other words, complex sub-volumes can be built and can be defined by the set theoretic intersection or union of the so defined tubes or prims (with base as given by the profile curve PC) along the respective propagation curve segments.

As a yet further variant of the above, although in the previous examples the profile shape remains constant throughout its propagation along a given curve PC, this may not necessarily be so in all embodiments. For instance, an initial profile shape may be chosen which propagates along the propagation curve along a first distance. The user then issues an interrupt signal which halts the propagation. The profile shape is then changed by using shape editing tool PSE and the propagation is then resumed but now with a different shape. This profile change can be done a couple of times along the propagation direction to obtain a sub-volume SV with sections where the profile shape is different. If the profile shape is changed, an interpolation scheme such as spline based or any other numerical technique can be used to ensure smooth shape transitions or "morphing" between the changed profile shapes.

It should be noted that the profile shape rather than being user defined, can also be automatically identified in region of interest by shape finder SF. For instance, the profile shape may be defined as the convex hull around a section of the region of interest in the respective viewing plane. The convex hull is then slightly expanded to allow for the definition of the re-section margin. This approach will in general define a polygon as shown in FIG. 4B around the region of interest ROI.

As mentioned earlier, the proposed method herein allows respecting stratifications within the volume IV. For instance, in the image volume IV, fat and muscle tissue may be encoded by different voxel values which define surfaces within the image volume. A segment of the sub-volume SV can then be pruned or "cut out" by intersection same with two surfaces, e.g., as given by organ boundaries or surfaces derived from organ boundaries (eg, by a required minimum distance to another organ boundary). Alternatively, the sub-volume SV can be pruned over a single organ surface boundary and predefined length of the tube SV. According to one embodiment, if the propagation direction passes through an interface between two such strata the propagation is aborted. For instance, propagation by the profile shape along the profile curve is aborted if at least one point of the profile shape intersects with such an interface. In another embodiment, the propagation of the profile shape is extended through the interface and is then halted immediately after all points of the curve have passed through the surface. In sum, all the above essentially define a truncation of the propagated sub-volume by the respective interfaces between the different strata.

At optional step S230 the so defined (possibly truncated) sub-volume is then rendered for view on monitor MT. This can take many forms and FIGS. 5A, B show examples of this. In the preferred embodiment the sub-volume is shown at its respective position within the sub-volume rendered in a different color or hue. In alternative embodiments it may be beneficial to show only the sub-volume without the surrounding image volume or it may be beneficial to show the image volume with the sub-volume removed.

Instead of or in addition to step S230, at an optional step S240 the numerical volume of the sub-volume or the ratio between the numerical volume of the sub-volume and the numerical volume of the image volume IV is then computed by volume quantifier VQ and output in numerical form on screen MT together with the displayed sub-volume- and or total volume IV.

In further optional step S250, it is established whether the region of interest is wholly (or entirely) embedded in the sub-volume and if not a respective alert signal will be issued. As an extension of this, the alert signal may also be issued if more than the pre-defined amount of the region of interest extends beyond the sub volume. The sub-volume is meant to embed the critical ROI (eg, the cancerous tissue). In particular, the sub-volume is meant to wholly or completely include the ROI plus a suitable re-section margin (the safety margin) around ROI. In this respect the volume quantifier VQ can also be configured to perform a monitoring functionality. In other words, the volume quantifier VQ monitors whether the region of interest is wholly contained within the so defined sub-volume SV. If the ROI is not wholly contained therein, a suitable alert signal (e.g., an acoustic signal) is be issued by activating a transducer TR (such as a loud speaker) or by issuing a suggestive visual indication will be displayed on monitor MT or on a dedicated flash light TR. In the alternative rather than monitoring for whole inclusion of the region of interest in the sub-volume SV, the volume quantifier may also be configured to indicate the alert signal if more than the pre-defined amount of said region of interest extends beyond the sub-volume SV. Again, the user can be informed thereof by issuing an acoustic or visual warning signal by controlling transducer TR or by indicating this fact graphically on monitor MT. The pre-defined amount (such as a percentage value or other threshold in absolute terms) may be user adjustable. In addition or instead, the alert signal may be issued if a part of the currently swept out sub-volume exceeds a pre-defined (and possible user adjustable) volume threshold. Also, if this happens, the propagation of the shape PS may be halted and resumes only upon the user issuing a confirmation signal.

Figure 3:
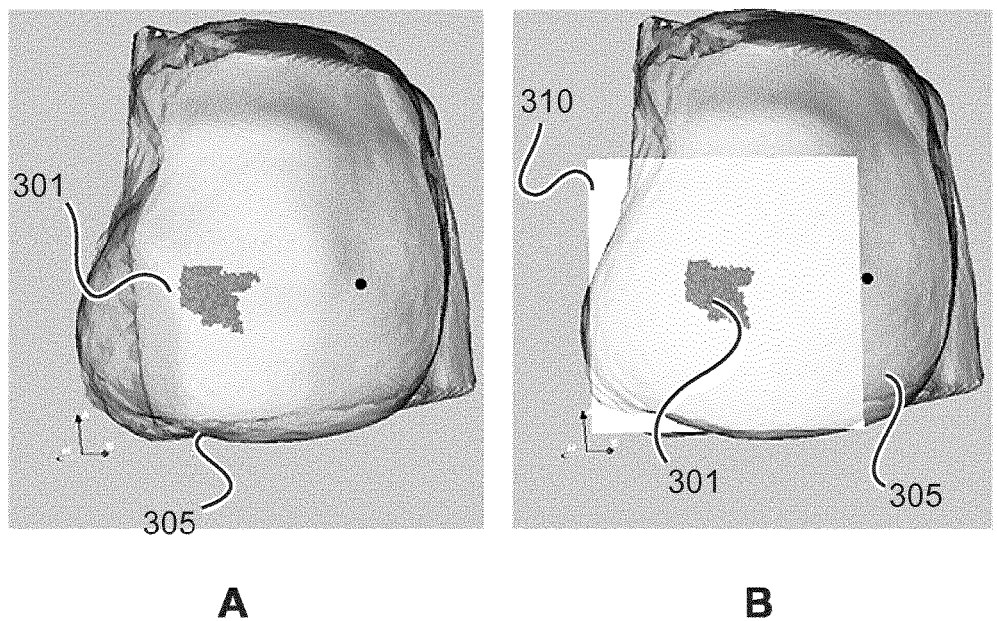
FIGS. 3-5 show exemplary imagery produced by the image processing method as per FIG. 2.
Figure 4:
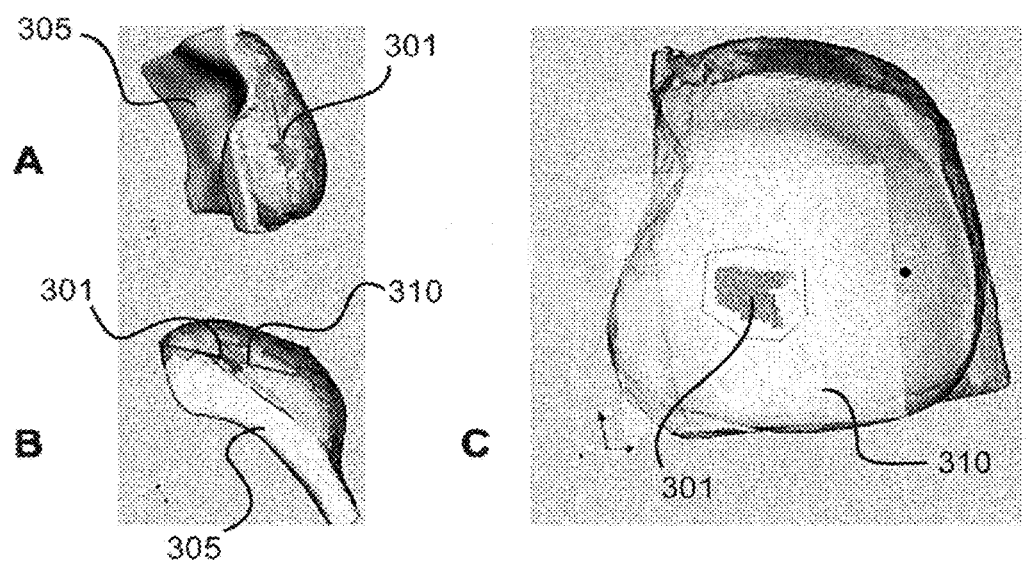
Figure 5:
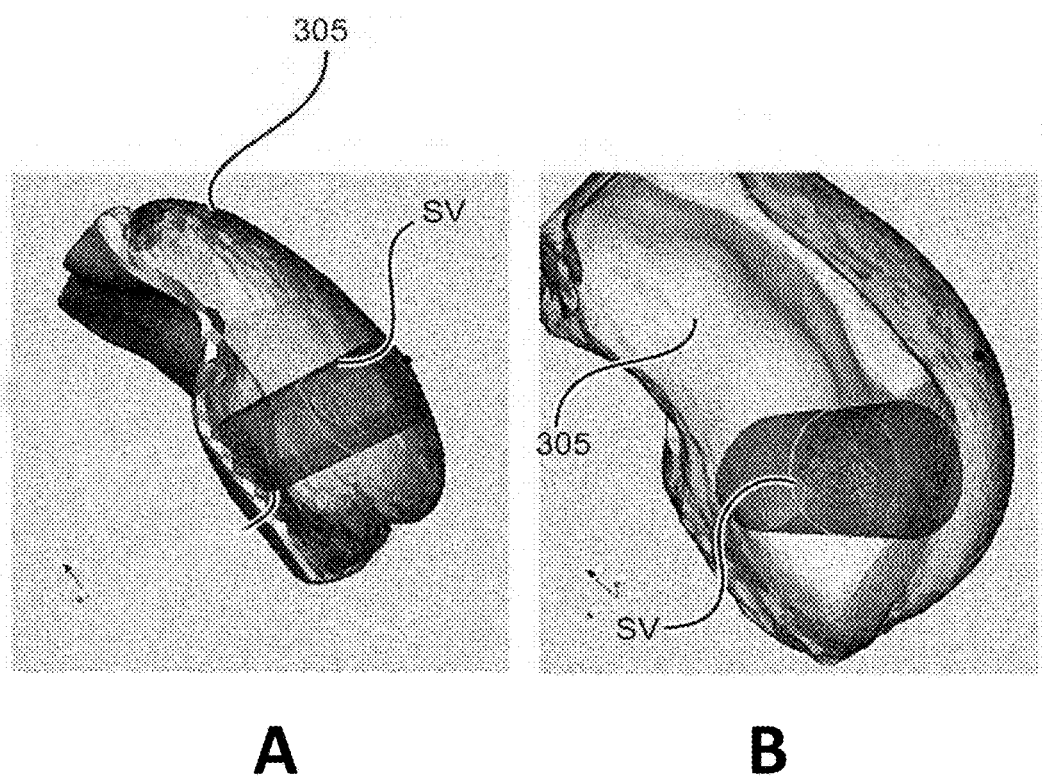

Turning now to FIGS. 3-5, these show in more detail exemplary imagery (in the exemplary context of breast surgery) and renderings thereof to illustrate the concepts explained above at FIGS. 1 and 2.

FIG. 3A left shows a 3-dimensional representation of a female breast. The 3D representation 305, a mesh rendering that is, is stratified in that it includes skin surface as well as a surface that represents the pectoral muscle. A tumor definition 301 is shown inside the breast volume 305. In pane B, the viewing plane 310 runs through the center of the tumor 301, parallel to projection plane as per the current view. In one embodiment, as mentioned above, the viewing plane can be interactively positioned. In FIG. 3, the viewing plane also implicitly defines the projection direction along which the profile shape SP is to be translated to define the sub-volume SV within volume IV designated as reference numeral 305.

In this particular configuration, the trajectory PC is linear and runs along the plane's 310 normal although this may not also be so as shown in panes A,B of FIG. 4, where the viewing direction is perpendicular to the propagation direction along the normal of plane 310 shown in side elevation. Panes A,B of FIG. 4 afford each a side elevation of the views as per panes A,B of FIG. 3 and the plane 310 is now likewise shown in side elevation (as a line). A configuration where the viewing direction on the volume IV does not coincide with the propagation direction (such as side elevation view as at 4A, B) may be beneficial to allow the user to better visualize the propagation of the profile shape along the respective curve. In other words, once the propagation direction is defined, the viewing direction can be changed by the user and the propagation direction (with the profile PS propagating therealong) is then visualized in different perspective rendering in response to these view direction changes.

Pane B shows contour PS as a polygonal cross-section of the resection volume SV drawn around the tumor site 310 on the drawing plane.

In one embodiment, the system IPS is configured to automatically switch to such as side-elevation view once the shape propagation commences. In particular, in one embodiment the displaying of sub-volume SV proceeds gradually and accumulatively. In other words, the user can actually see on screen MT how the profile shape proceeds along the propagation curve along the volume. In yet other words, the build-up of the sub-volume SV is gradually displayed in accumulation layer by layer.

However, alternative embodiments are also envisaged, where the sub-volume is computed in the background once the user has input the respective parameter (in particular the propagation curve and the profile shape) and the so fully computed sub-volume is then rendered at once on the screen.

As an extension of the above, although in one embodiment the propagation direction is initiated after the user issues an OK signal, a more interactive mode is likewise envisaged. According to this mode, once the user has defined the profile shape and the propagation curve, propagation along the curve occurs in concert with the concurrent motion under the control of the user, for instance on a touch screen the user may trace out with his finger the propagation curve and the profile shape then traces out the sub-volume during the user's finger swipe action. Similarly, the user can use the familiar mouse drag operation to outline a propagation curve whilst at the same time the profile shape travels along the propagation curve following the user's outlining or current touch screen finger action.

FIG. 5, pane A shows an example of a generated volume IV. The resection volume SV (dark shaded) was generated by translating the polygonal cross-section as drawn in FIG. 4C along a line perpendicular to the drawing plane. In addition the volume is automatically truncated at the skin surface and the fascia of the pectoral muscle. Pane B shows a cylindrical sub-volume SV generated by a circular cross section PS.

The image processing module IPS may be arranged as a software module and may be run on a general purpose computing unit or a dedicated computing unit. Specifically, processor IPS may be executed on an image viewing workstation console of an imaging system. The image processing module IPS with some or all of its components may be resident on the executive agency (such as a general purpose computer, workstation or console) or may be accessed remotely/centrally by the executive agency via a suitable communication network in a distributed architecture.

Alternatively, the components of the image processing module IPS may be arranged as dedicated FPGAs (field-programmable gate array) or as similar standalone chips. As a non-limiting example, the components may be programmed in a suitable scientific computing or development platform such as Matlab® or Simulink® and then translated into C++ or C routines maintained in a library and linked when called on by the executive agency such as the general purpose computer, workstation or console.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing method, comprising:
receiving an image volume, a 2D profile shape, and a propagation curve, wherein said 2D profile shape and said propagation curve are directly provided by a user;
propagating said 2D profile shape across the image volume along said propagation curve to thereby generate a sub-volume in said volume, wherein said sub-volume encloses a pre-defined region of interest and a safety margin around the predefined region of interest;
monitoring said sub-volume during said propagation of said 2D profile shape along said propagation curve;
based on the monitoring, determining that said sub-volume does not properly enclose said pre-defined region of interest and said safety margin of said pre-defined region of interest;

in response to the determining:
    automatically halting said propagating of said 2D profile shape across the image volume along said propagation curve;
    causing an alert to be output by one or more output components of one or more computing devices;
    receiving an additional propagation curve, wherein said additional propagation curve is distinct from said propagation curve; and
    propagating said 2D profile shape across the image volume along said additional propagation curve to continue generating the sub-volume in said volume; and
displaying said sub-volume on a display device, wherein the image volume is stratified, wherein the propagation of said profile shape automatically terminates at an interface between two strata in the volume so that the sub-volume does not extend across said interface.

2. The image processing method of claim 1, comprising displaying of said sub-volume together with the image volume.

3. The image processing method of claim 1, comprising displaying the image volume, or at least a part thereof, and gradually building up display of the sub-volume during said 2D profile shape propagation whilst the sub-volume is being swept out in the image volume.

4. The image processing method of claim 1, comprising:
computing a size of the sub-volume; or
computing a ratio between the sub-volume and the volume.

5. The image processing method of claim 4, comprising:
issuing a first signal if the computed size of the sub-volume violates a first predefined threshold; or
issuing a second signal if the computed ratio violates a second pre-defined threshold, wherein the second pre-defined threshold is distinct from the first pre-defined threshold.

6. The image processing method of claim 1, wherein the image volume is any one of an MM image, a CT image, an optical 3D image, a 3D ultrasound image, or a personalized or generic model.

7. The image processing method of claim 1, wherein the 2D profile shape is adjustable.

8. The image processing method of claim 1, wherein the 2D profile shape is automatically identified in the image volume.

9. An image processing system (IPS), comprising:
one or more processors; and
memory storing instructions, that when executed by one or more of the processors, cause one or more of the processors to:
    receive an image volume, a 2D profile shape, a propagation curve wherein said 2D profile shape and said propagation curve are directly provided by a user;
    propagate said 2D profile shape across the image volume along said propagation curve to thereby generate a sub-volume in said volume, wherein said sub-volume encloses a first portion of a pre-defined region of interest and a safety margin around the predefined region of interest;
    monitor said sub-volume during said propagation of said 2D profile shape along said propagation curve;
    based on the monitoring, determine that said sub-volume does not properly enclose said pre-defined region of interest and said safety margin of said pre-defined region of interest
    in response to the determining:
        automatically halt said propagating of said 2D profile shape across the image volume along said propagation curve;
        cause an alert to be output by one or more output components of one or more computing devices;
        receive an additional propagation curve, wherein said additional propagation curve is distinct from said propagation curve; and
        propagate said 2D profile shape across the image volume along said additional propagation curve to continue generating the sub-volume in said volume; and
    display said sub-volume on a display device, wherein the image volume is stratified, and wherein the propagation of said profile shape automatically terminates at an interface between two strata in the volume so that the sub-volume does not extend across said interface.

10. The image processing system of claim 9, wherein the instructions further cause one or more of the processors to adjust the shape profile in response to a request.

11. The image processing system of claim 9, wherein the instructions further cause one or more of the processors to automatically detect in the image volume the shape profile.

12. The image processing system of claim 9, wherein the instructions further cause one or more of the processors to:
compute a size of the sub-volume; or
compute a ratio between the sub-volume and the volume.

13. A non-transitory computer readable storage medium storing computer instructions executable by a processor to perform a method comprising:
receiving an image volume, a 2D profile shape, and a propagation curve wherein said 2D profile shape and said propagation curve are directly provided by a user;
propagating said 2D profile shape across the image volume along said propagation curve to thereby generate a sub-volume in said volume, wherein said sub-volume encloses a pre-defined region of interest and a safety margin around the predetermined region of interest;
monitoring said sub-volume during said propagation of said 2D profile shape along said propagation curve;
based on the monitoring, determining that said sub-volume does not properly enclose said pre-defined region of interest and said safety margin of said pre-defined region of interest; and
in response to the determining:
    automatically halting said propagating of said 2D profile shape across the image volume along said propagation curve;
    receiving an additional propagation curve, wherein said additional propagation curve is distinct from said propagation curve; and
    propagating said 2D profile shape across the image volume along said additional propagation curve to continue generating the sub-volume in said volume; and
displaying said sub-volume on a display device, wherein the image volume is stratified, and wherein the propagation of said 2D profile shape automatically terminates at an interface between two strata in the volume so that the sub-volume does not extend across said interface.

* * * * *